United States Patent
Wajid

(10) Patent No.: US 9,217,663 B2
(45) Date of Patent: Dec. 22, 2015

(54) MULTI-CHAMBERED ACOUSTIC SENSOR FOR DETERMINATION GAS COMPOSITION

(71) Applicant: Inficon, Inc., East Syracuse, NY (US)

(72) Inventor: Abdul Wajid, East Syracuse, NY (US)

(73) Assignee: Inficon, Inc., East Syracuse, NY (US)

(*) Notice: Subject to any disclaimer, the term of this patent is extended or adjusted under 35 U.S.C. 154(b) by 313 days.

(21) Appl. No.: 13/683,121

(22) Filed: Nov. 21, 2012

(65) Prior Publication Data

US 2013/0125622 A1    May 23, 2013

Related U.S. Application Data

(60) Provisional application No. 61/562,661, filed on Nov. 22, 2011.

(51) Int. Cl.
*G01N 29/02* (2006.01)
*G01H 3/00* (2006.01)
*G01H 5/00* (2006.01)

(52) U.S. Cl.
CPC ... *G01H 3/00* (2013.01); *G01H 5/00* (2013.01)

(58) Field of Classification Search
CPC .................................. G01H 3/00; G01H 5/00
See application file for complete search history.

(56) References Cited

U.S. PATENT DOCUMENTS

| | | | |
|---|---|---|---|
| 2,775,885 A * | 1/1957 | Rassweiler et al. | 73/24.01 |
| 3,353,400 A * | 11/1967 | Schafft | 73/24.06 |
| 4,662,212 A | 5/1987 | Noguchi et al. | |
| 5,159,843 A * | 11/1992 | Shakkottai et al. | 73/24.05 |
| 5,319,938 A * | 6/1994 | Lucas | 62/6 |
| 5,392,635 A * | 2/1995 | Cadet et al. | 73/24.01 |
| 5,501,098 A * | 3/1996 | Cadet et al. | 73/24.01 |
| 5,515,684 A * | 5/1996 | Lucas et al. | 62/6 |

(Continued)

FOREIGN PATENT DOCUMENTS

| CN | 85105865 A | 11/1986 |
|---|---|---|
| CN | 1135801 A | 11/1996 |

(Continued)

OTHER PUBLICATIONS

International Search Report/Written Opinion (ISR/WO); mailed Feb. 7, 2013 (10 pages).

(Continued)

*Primary Examiner* — Laura Martin
*Assistant Examiner* — Samir M Shah
(74) *Attorney, Agent, or Firm* — Barclay Damon, LLP

(57) ABSTRACT

A sound velocity sensor is defined by a hermetic multi-chambered enclosure for containing flowing gases and mixtures of gases. The contained flowing gases are acoustically excited and the acoustic energy is measured over a fixed distance between a first sending end of the enclosure and a receiving end. The speed of sound of the gases are determined by comparing the energy transmitted through the flowing gases at various frequencies so as to precisely determine the resonant frequency of the gases flowing through the enclosure. In accordance with the present design, the chambers of the enclosure include internal transition shapes therebetween for optimizing the transmission of acoustic energy through the flowing gases and also enhancing one or more additional resonant modes at higher useful frequencies. The transition shapes used in connection with the sensor can be at least one of parabolic, hyperbolic, linear and exponential in nature.

14 Claims, 3 Drawing Sheets

(56) References Cited

U.S. PATENT DOCUMENTS

| | | | |
|---|---|---|---|
| 5,528,924 A * | 6/1996 | Wajid et al. | 73/24.06 |
| 5,768,937 A * | 6/1998 | Wajid et al. | 73/24.06 |
| 6,367,329 B1 * | 4/2002 | Reitman et al. | 73/597 |
| 6,378,372 B1 * | 4/2002 | Karr | 73/579 |
| 6,626,026 B2 * | 9/2003 | Banda et al. | 73/24.01 |
| 6,792,764 B2 * | 9/2004 | Poese et al. | 62/6 |
| 7,228,740 B2 * | 6/2007 | Sinha | 73/579 |
| 7,275,437 B2 * | 10/2007 | Bukin | 73/597 |
| 8,850,893 B2 * | 10/2014 | Seppa et al. | 73/579 |

FOREIGN PATENT DOCUMENTS

| | | |
|---|---|---|
| CN | 201247215 Y | 5/2009 |
| CN | 101949893 A | 1/2011 |
| WO | WO 96/10246 | 4/1996 |

OTHER PUBLICATIONS

Chinese Office Action for CN 201280057412.8; mailed Jul. 30, 2015 (17 pages).

* cited by examiner

MULTI-CHAMBERED ACOUSTIC SENSOR FOR DETERMINATION GAS COMPOSITION

CROSS REFERENCE TO RELATED APPLICATIONS

This application claims priority to U.S. patent application Ser. No. 61/562,661, filed Nov. 22, 2011, pursuant to relevant sections of 35 U.S.C. §119 and 37 C.F.R. §1.53 and which is incorporated by reference in its entirety. Reference is also made herein to U.S. Pat. Nos. 6,482,649 and 5,768,937, wherein the entire contents of each are herein incorporated by reference.

TECHNICAL FIELD

This application relates generally to the field of substrate processing and more specifically to a multi-chambered acoustic transducer or cell that is used for determining and controlling gas compositions relative to various chemical vapor deposition (CVD) processes.

BACKGROUND AND SUMMARY

Chemical vapor deposition (CVD) processes are extensively used to grow layers of various thicknesses of metals, semiconductors, dielectrics and the like. A typical CVD process ordinarily requires that desired growth materials be attached to a ligand or volatile adduct that allows the transport of the desired species in the gas phase to a reaction zone in a reactor in which a substrate(s) is located. This complex molecule is commonly referred to as the precursor. Different materials possess different precursor structures.

Once in the reaction zone, a portion of the volatile precursor compound is decomposed, separating the volatile precursor compound from the non-volatile portion and leaving behind the desired solid deposit onto the substrate(s). Typically, the decomposition reaction is thermally driven; that is, the substrate is heated to a sufficiently high temperature such that when the volatile compound contacts the substrate, sufficient energy is made available to break the existing connectivity between the volatile ligand or adduct and the desired atom. The desired atom remains deposited on the substrate, while the volatile portion of the precursor gas is then exhausted from the reactor through an exit port. While thermal energy is one means for driving the CVD reaction, there are other process mechanisms that can be utilized for promulgating a suitable deposition.

Applicants have previously determined, as described in U.S. Pat. No. 6,482,649, entitled: Acoustic sensor for in-line continuous monitoring of gasses, the provision of at least one acoustic cell in a gas controller for controlling precursor delivery in a CVD reactor, such as a MOCVD (metalorganic Chemical Vapor Deposition) reactor and determining the composition of a binary gas mixture in order to ascertain the efficiency of the reactor. Such reactors were used, for example, for purposes of fabricating compound semiconductor devices for purposes of fiber-optic communications. The speed of sound of the gases flowing through the device are calculated wherein the device is operated in resonant mode. Inlet and outlet (exhaust) gas compositions can be ascertained from measured resonant frequency and speed of sound determinations. Utilizing the principles described in the '649 patent, Applicants have since commercialized a system referred to under the tradename, Composer Gas Controller.

At the present time, there is a resurgence of interest in MOCVD reactors, for example, for high brightness LED manufacturing processes. While the currently designed Composer device has been unsurpassed for its resolution and repeatability of measurements in its day, there are presently new challenges that the current device was not specifically designed to cope with. For example, TMIn precursor delivered by hydrogen carrier gas was typical in the past. At the present time, however, the delivery of Cp2Mg using nitrogen as a carrier gas is the biggest challenge. FIG. 1 graphically depicts each of the foregoing examples. In regard to same, the molecular weight ratio of the precursor to carrier gas is the most important factor in determining theoretical resolution of the device, as described in the above '649 patent, which is herein incorporated by reference in its entirety. Thus and in specifically transitioning from hydrogen carrier gas to nitrogen carrier gas, this key factor is diminished by a factor of fourteen.

It has been determined that this disadvantage can be significantly overcome, however, through various modifications to the acoustic resonator, as described herein, which now enables operation of the acoustic resonator at higher frequencies but without drastically altering its overall dimensions.

The constraints of commercially available acoustic transducers and microphones for introduction of acoustic energy, as well as the limitations of isolation diaphragms dictate that the device should operate in the frequency range of approximately 500 Hz to approximately 5000 Hz as a matter of practicality. In a compound resonator comprising multiple cavities of different sizes, such as those described in Applicants' prior U.S. Pat. No. 6,482,649, the admissible resonance frequencies are not harmonically related. For example, in the newly designed acoustic resonator (to be elaborated below), the theoretical resonance frequencies are 1208 Hz, 3948 Hz, 6827 Hz, 10161 Hz, etc. in nitrogen gas at room temperature. Although the resonance frequencies are different in different gases, however, the frequency ratios remain the same and are dictated by the geometry of the compound resonator.

Therefore a sound velocity sensor is herein provided, the sensor comprising a hermetic multi-chambered enclosure for containing flowing gases and mixtures of gases, means for acoustically exciting the contained flowing gases, and means for measuring acoustic energy transmitted over a fixed distance between a first sending end of said enclosure and a receiving end thereof. The speed of sound of the gases is determined by comparing the energy transmitted through the flowing gases at various frequencies so as to precisely determine the resonant frequency of the gases that are flowing through the enclosure. In accordance with the present design, the chambers of the enclosure include internal transition shapes therebetween for optimizing the transmission of acoustic energy through the flowing gases and for enhancing one or more additional resonant modes at higher useful frequencies.

The transition shapes used in connection with the herein described sound velocity sensor can be at least one of parabolic, hyperbolic, linear and exponential in nature or other suitable continuous shape to facilitate the transmission of acoustic energy and to minimize acoustic impedance loss in the chambered enclosure of the sensor.

The additional resonant modes achievable by the presently described sensor are within the range where readily available sending, receiving transducers and isolation diaphragms may be produced and the devices fail to have self-resonant modes of consequence.

According to one preferred version, the fundamental resonant frequency and additional resonant frequencies lie between about 400 Hz and about 6000 Hz.

The temperature of the sensor housing and the gases flowing therethrough are preferably controlled to arbitrarily precise levels.

The determined resonant frequencies can be used, for example, for deriving the composition of a binary gas mixture used in a reactor such as those utilizing MOCVD processes.

Advantageously, the sensor improvements discussed above enhance the stability and sensitivity of the resonant frequency determinations, as well as the resulting velocity of sound calculations obtained.

These and other features and advantages will be readily apparent from the following Detailed Description, which should be read in conjunction with the accompanying drawings.

DETAILED DESCRIPTION

The following description relates to an exemplary acoustic resonator (also referred to throughout as an "acoustic cell", or "acoustic (sound velocity) sensor") for use in a Chemical Vapor Deposition (CVD) or other form of processing reactor. It will be readily apparent that other suitable modifications and variations are possible within the level of one of ordinary skill in the field. Additionally, a number of background features pertaining to CVD reactor systems are referred to throughout this description through reference to U.S. Pat. Nos. 6,482,649 and 5,768,937, each incorporated by reference in their entirety.

Figure 4:
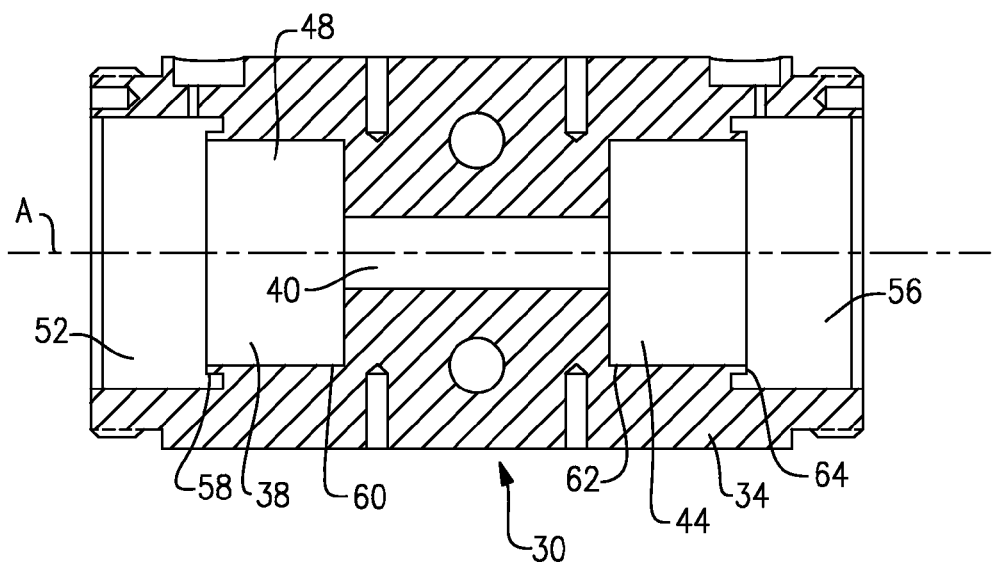
FIG. 4 is a partial sectioned elevational view of a prior art acoustic resonator.

Reference is first herein made to FIG. 4, depicting a prior art compound acoustic resonator 30, which is used in combination with a CVD or other similar process reactor (not shown), as also described in U.S. Pat. No. 6,482,649. It is understood the overall reactor system includes a plurality of components including various sensors, the reactor itself, a bubbler chamber and the like. Reference is herein made to the '649 patent in terms of aspects relating to each of these components, wherein the focus of this discussion is made to an acoustic cell or resonator which is used therewith.

The acoustic resonator 30 utilized is defined by a housing 34, preferably made from a metallic material and including a plurality of adjacent acoustic cavities 38, 40, 44 which combine to form a resonator chamber 48. A driving means, such as a driving microphone (not shown), is provided at one sending end 52 of the resonator 30 to send an acoustic signal through gas flowing through the acoustic cavities 38, 40, 44, the gas being caused to flow via appropriate inlet and outlet ports (not shown) through the resonator chamber 48 and in which the acoustic energy is received by a receiving microphone (not shown) that is disposed at the opposing receiving end 56 of the resonator 30. Details relating to the driving and receiving means/microphones, the gas inlet and outlet ports and related features are provided in the previously incorporated '649 patent.

In this prior art compound resonator 30, the acoustic cavities 38, 40, 44 are each defined by different cross sections, the cavities being linked to one another to define the overall resonator chamber 48 by respective discontinuous end segments 56, 60, 62, 64 in which each acoustic cavity is defined by a fixed diameter and cross section and wherein the diameter of the acoustic cavity 40 is much smaller than the diameter of the adjacent acoustic cavities 38, 44. In operation, a binary gas mixture (e.g., precursor and carrier gas) is caused to flow from a gas inlet port into the acoustic cavity 38 wherein the gas is further caused to flow through each of the adjacent acoustic cavities 42, 44 to a gas outlet port. Acoustic energy is applied at the sending end of the housing 34 and through the acoustic cavities defining the resonator chamber 48. Temperature of the housing and of the flowing gases are sensed and controlled to arbitrarily precise levels (e.g., 0.1 degrees C.) during this operation. The resulting acoustic energy as measured at the receiving end of the housing 34 provides an indication of the speed of sound (c), this data then being used in the manner described in accordance with the '649 patent to determine gas composition, reactor efficiency and other parameters.

It has been determined, however that there is a accompanying transmission loss at the interface of two segments (e.g., at 56, 60, etc) due to the mismatch in the acoustic impedance[1]. It is known that acoustic impedance is inversely proportional to the cross-sectional area of the element.

[1] Fundamentals of Acoustics, L. E. Kinsler, A. R. Frey, A. B. Coppens & J. V. Sanders, Third edition, page-234

Figure 5:
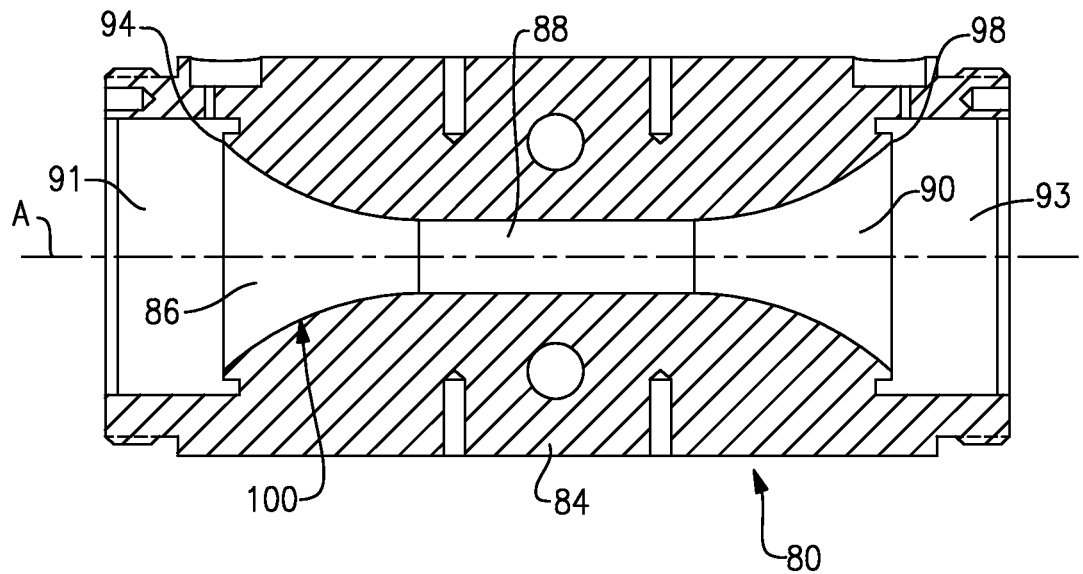
FIG. 5 is a partial sectioned elevational view of an acoustic resonator according to an exemplary embodiment.
Figure 6:
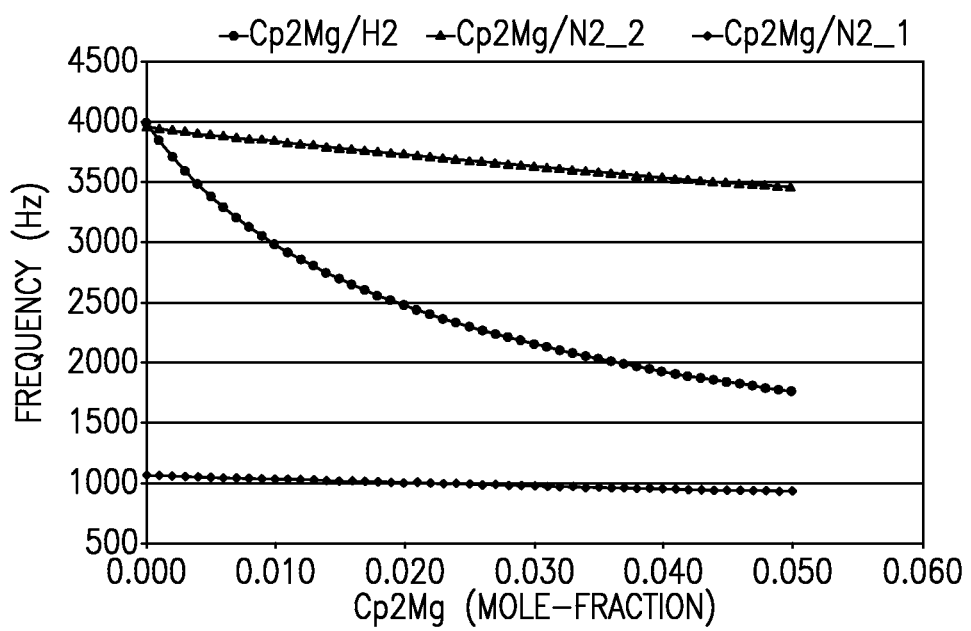
FIG. 6 illustrates a comparative frequency shift due to a specific precursor gas in hydrogen and nitrogen carrier gases in two resonant modes wherein the sensitivity is quadrupled by operating in the second resonant mode according to an exemplary embodiment.

This loss can be minimized by adjusting the transition between chambers (cavities) of the acoustic resonator and more preferably in creating gradual transition shapes between the acoustic cavities defining the enclosure. FIG. 5 depicts one exemplary embodiment of an acoustic resonator 80 similar to the preceding version in that the resonator is defined by a metallic housing 84 having three (3) adjacent acoustic cavities 86, 88, 90 as well as a sending end 91 that receives an acoustic energy driving means, such as a microphone (not shown) and an opposite receiving end 93, which includes a compatible means for receiving the acoustic energy driven through the resonator 80. According to this design, however, the acoustic cavities 86, 90 are not provided with a constant cross section wherein the diameter of the acoustic cavity 86 inwardly tapers along a parabolic profile 100 commencing at the end segment 94 toward the smaller adjacent acoustic cavity 88. The inner diameter of the acoustic cavity 88 is substantially constant over its axial length wherein the diameter of the adjacent acoustic cavity 90 outwardly increases, also along the same parabolic profile 100 of acoustic cavity 86, extending to end segment 98. The parabolic profile 100 provides a gradual transition between each of the acoustic cavities and eliminates any discontinuities therebetween which may tend to cause acoustic impedance through the resonator 80. It should be noted that the use of a parabolic taper interconnecting the acoustic cavities of the herein described device is exemplary. It has been further realized that other non-fixed versions of gradual tapers can also be utilized; for example, hyperbolic, exponential and linear tapers have all been tested and verified as providing beneficial results in the transmission of acoustic energy with reduced acoustic impedance loss. The end result is a better signal to noise ratio in the measurement of resonant frequencies.

As a result of the above-noted geometric changes now provided by the acoustic device of FIG. 5 as compared with the prior art device version depicted at FIG. 4, the swept volume of the system has been reduced. In the specific example described herein, the swept volume is reduced from approximately 18 cc to under 9 cc. Providing a reduced swept volume is advantageous as it shortens the response time during sudden changes in flowing gas composition.

Figure 1:
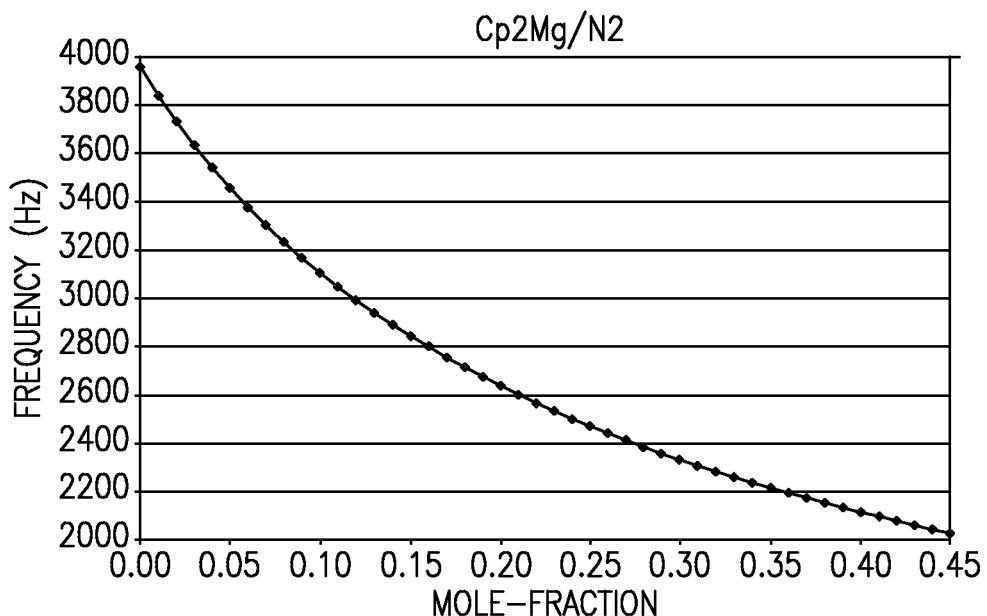
FIG. 1 is a graphical representation relating frequency shift versus binary gas composition involving a specific precursor using various carrier gas combinations.
Figure 2:
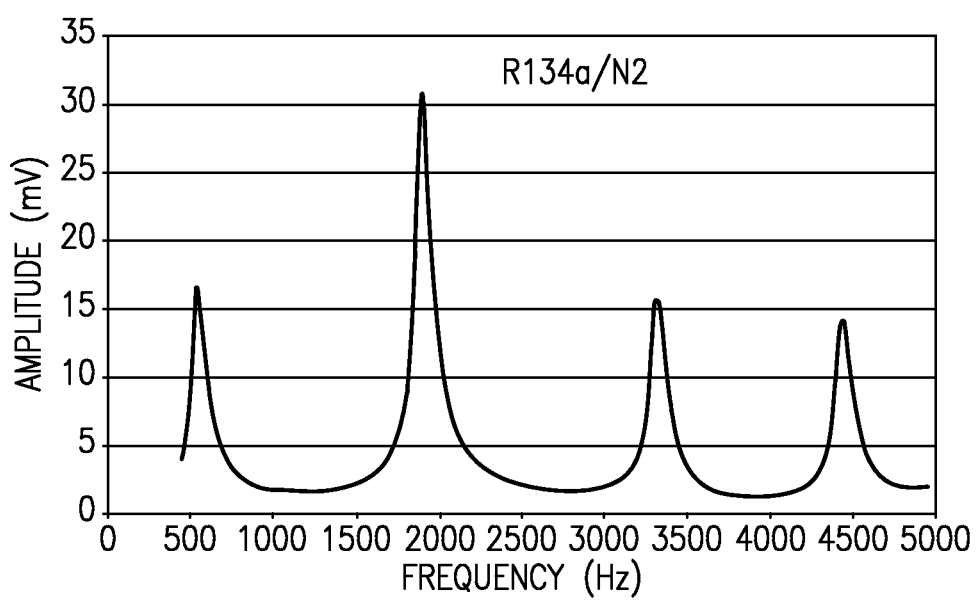
FIG. 2 is a graphical representation of resonance peaks created for a specific gas combination using an acoustic resonator made in accordance with one embodiment.

An additional benefit using the herein described acoustic resonator design is an enhancement in the resonant modes, enabling the device to be utilized with various precursor/carrier gas combinations such as those employing nitrogen as a carrier gas as opposed to hydrogen. For example and using the herein described acoustic device in a reactor system such as generally described by the '639 patent and referring to FIG. 2, the resonance peaks of R134a in nitrogen gas (arbitrary composition) within the window of 500 Hz to 5000 Hz are shown using the herein described acoustic resonator 80. By applying a drive signal of continuously varying frequency (sweeping), multiple resonance peaks can advantageously be identified. Occasionally, some of the peaks are spurious, such as, due to microphone resonance or resonances in the gas inlet/outlet tubes. Since the frequency ratios of genuine adjacent peaks would be known, those spurious peaks that don't fit the pattern can easily be identified and discarded.

Figure 3:
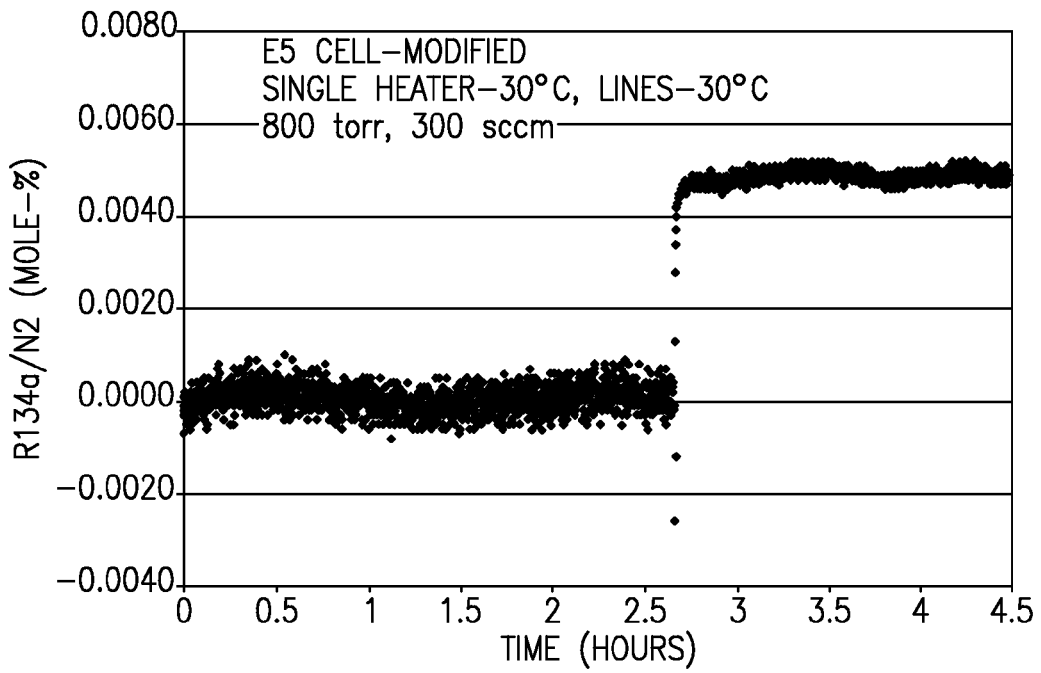
FIG. 3 is a representation of the stability of the acoustic resonator in accordance to one embodiment thereof.

Once the spurious peaks have been discarded, the remaining resonance peaks are analyzed and the peak with the highest Q (Quality factor) value is selected for continuous monitoring. Generally speaking, the highest frequency peak possesses the highest Q value. For example, in the herein described acoustic resonator in nitrogen gas at STP, the first peak appears at around 1208 Hz with Q=21. The next peak appears at 3948 Hz with Q=72. Thus, the second peak is expected to provide better measurement stability and roughly four times better sensitivity as compared to the first peak. FIG. 3 shows the typical sensitivity of the acoustic device 80 by way of example in pure nitrogen gas and nitrogen blended with 50 ppm of R134a.

PARTS LIST FOR FIGS. 1-5

30 acoustic resonator
34 housing
38 acoustic cavity
40 acoustic cavity
44 acoustic cavity
52 end, sending
56 end, receiving
58 end segment
60 end segment
62 end segment
64 end segment
80 resonator
84 housing
86 acoustic cavity
88 acoustic cavity
90 acoustic cavity
91 end, sending
93 end, receiving
94 end segment
98 end segment
100 taper, gradual (transition shape)

It will be understood that other variations and modifications are possible within the intended ambit of the concepts described herein that would be readily apparent to one of sufficient skill in the field.

The invention claimed is:

1. A sound velocity sensor for analyzing the gas concentration of a flowing mixture of gases, the sensor comprising:
a hermetic enclosure including an interior having a pair of acoustic cavities separated by a constricted region and defining a resonator chamber;
gas flowing means, fluidly connected to the enclosure, for flowing a gas mixture through the resonator chamber, the gas mixture including nitrogen as a primary carrier gas;
acoustic driving means at a first sending end of the enclosure for transmitting an acoustic signal through the gas mixture flowing through the enclosure;
receiving means at a second receiving end of the enclosure for receiving the acoustic signal;
a processor configured to process the received acoustic signal; and
means for detecting a resonant frequency of the flowing gas mixture and determining the composition of the gas mixture in which a first acoustic cavity of said enclosure is defined by an inwardly curved and tapering shape extending from the first sending end and an opposing second acoustic cavity is defined by an outwardly curved and tapering shape extending to the second receiving end with a narrow constricted region being defined between the first and second acoustic cavities for optimizing the transmission of acoustic energy through the flowing gas mixture and enhancing at least one additional resonant mode at higher useful frequencies.

2. A sensor as recited in claim 1, wherein the curved and tapering shapes are defined by a continuous shape configured for facilitating the transmission of acoustic energy and minimizing acoustic impedance loss in said sensor.

3. A sensor as recited in claim 1, wherein the curved and tapering shapes are hyperbolic.

4. A sensor as recited in claim 3, wherein the at least one additional resonant mode achievable by the sensor is within a predetermined range in which available sending, receiving transducers and isolation diaphragms may be produced and the transducers and diaphragms fail to have self-resonant modes of consequence.

5. A sensor as recited in claim 1, wherein the curved and tapering shapes are exponential.

6. A sensor as recited in claim 1, wherein the curved and tapering shapes are linear.

7. A sensor as recited in claim 1, including temperature controlling means for controlling a temperature of the enclosure and the flowing gas mixture.

8. A sensor as recited in claim 1, wherein the acoustic cavities of said enclosure are different in size relative to one another.

9. A sensor as recited in claim 1, in which a fundamental resonant frequency and additional resonant frequencies of said sensor lie between about 400 Hz and about 6000 Hz.

10. A sensor as recited in claim 1, wherein the sensor is configured for use in a MOCVD or CVD reactor.

11. A method for manufacturing a sound velocity sensor for a reactor utilizing MOCVD or CVD processes and utilizing a flowing gas mixture that includes nitrogen as a primary carrier gas, said method comprising the steps of:
providing a hermetic enclosure having a first sending end, an oppositely disposed second receiving end and a plurality of adjacently coupled acoustic cavities between the first sending end and the second receiving end, and defining a resonator chamber;

providing an acoustic signal generator and an acoustic signal receiver for transmitting an acoustic signal through the flowing gas mixture at the first sending end and for receiving the acoustic signal at the second receiving end; and providing continuous transition areas between at least two of said plurality of adjacently coupled acoustic cavities for improving the transmission of acoustic energy through the flowing gas mixture between the first sending end and the second receiving end.

12. A method as recited in claim 11, in which the continuous transition areas are defined by a hyperbolic shape.

13. A method as recited in claim 11, in which the continuous transition areas are defined by a curved shape.

14. A method as recited in claim 11, in which the continuous transition areas are substantially linear.

\* \* \* \* \*